US006193032B1

(12) United States Patent
Lesieutre et al.

(10) Patent No.: US 6,193,032 B1
(45) Date of Patent: Feb. 27, 2001

(54) PIEZOCERAMIC VIBRATION CONTROL DEVICE AND TUNING CONTROL THEREOF

(75) Inventors: George A. Lesieutre, State College, PA (US); Christopher L. Davis, Kent, WA (US); Jeffrey J. Dosch, Amherst, NY (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/033,570

(22) Filed: Mar. 2, 1998

(51) Int. Cl.[7] ....................................................... F16F 7/10
(52) U.S. Cl. ...................... 188/380; 267/140.15; 310/317
(58) Field of Search ............................. 267/136, 140.15, 267/140.14; 188/379, 380; 310/317, 318, 316.01; 318/114

(56) References Cited

U.S. PATENT DOCUMENTS

| 3,719,838 | * | 3/1973 | Peduto et al. | 310/315 |
|---|---|---|---|---|
| 3,754,152 | * | 8/1973 | Koehler et al. | 310/318 |
| 4,158,787 | * | 6/1979 | Forward | 310/319 |
| 4,633,982 | * | 1/1987 | Swigert | 188/379 |
| 4,940,914 | * | 7/1990 | Mizuno et al. | 310/316.01 |
| 5,087,850 | * | 2/1992 | Suzuta | 310/316.01 |
| 5,170,103 | * | 12/1992 | Rouch et al. | 318/128 |
| 5,270,607 | * | 12/1993 | Terajima | 310/316.01 |
| 5,347,870 | * | 9/1994 | Dosch et al. | 310/319 |
| 5,357,423 | * | 10/1994 | Weaver et al. | 310/316.01 |
| 5,378,974 | * | 1/1995 | Griffin | 318/649 |
| 5,390,949 | * | 2/1995 | Naganathan et al. | 267/162 |
| 5,558,477 | * | 9/1996 | Browning et al. | 188/380 |
| 5,783,898 | * | 7/1998 | Wu | 310/317 |
| 5,857,694 | * | 1/1999 | Lazarus et al. | 280/602 |

OTHER PUBLICATIONS

AIAA–95–1126–CP, pp 3440–3449, G. A. Lesieutre et al., "Modeling and Characterization of a Piezoceramic Inertial Actuator".

SPIE, vol. 2447, pp 14–25, Jeffrey Dosch et al., "Inertial piezoceramic Actuators for Smart Structures".

* cited by examiner

*Primary Examiner*—Robert J. Oberleitner
*Assistant Examiner*—Thomas Williams
(74) *Attorney, Agent, or Firm*—Thomas J. Monahan

(57) ABSTRACT

A piezoceramic vibration control device in which stiffness is established by a capacitor in shunt with piezoceramic element of the device. The device can be formed of a stack of piezoceramic elements bonded to one another and precompressed by a spring. A control system is arranged to tune the natural frequency of the vibration control device to a disturbance frequency or s primary structural response frequency by varying the capacitance of the capacitor.

4 Claims, 6 Drawing Sheets

PIEZOCERAMIC VIBRATION CONTROL DEVICE AND TUNING CONTROL THEREOF

FIELD OF INVENTION

This invention relates to vibration control devices which are useful as vibration actuators or as vibration absorbers.

BACKGROUND OF INVENTION

Vibrations in aerospace structures create many important and difficult engineering problems. In certain aircraft and rotorcraft applications, structural vibrations may increase interior cabin noise levels and/or accelerate material fatigue. Identifying the sources of troublesome vibrations and subsequently developing strategies for reducing these vibrations has been and continues to be the focus of a large body of research.

Interior noise levels in certain propeller driven aircraft, rotorcraft, and the more advanced high-speed turboprop aircraft are, in general, higher than desirable. In these vehicles, noise is generated from both airborne and structure-borne sources. Airborne noise arises from acoustic sources such as the interaction of the propeller wake/vortex with the aircraft fuselage or the impingement of jet exhaust directed at the fuselage. Structure-borne noise is a result of vibrations from the engine or vibrations from the interaction of the propeller wake/vortex with the wing surface being transmitted via the aircraft structure to the main cabin. In addition, the flexible attachment of the rotor blades to the rotor hub and gear meshing in the main rotor gearbox of rotorcraft may also generate extremely high cabin noise levels. Thus with many of the sources of interior noise identified, the problem becomes that of reducing the resulting noise vibration levels within the aircraft or rotorcraft cabin.

Structural acoustic control is a method for reducing the interior cabin acoustic field by reducing vibrations due to external excitation sources before they prop a gate to and excite the coupled interior structural acoustic modes of the aircraft fuselage. Direct airborne induced disturbances may be inhibited from propagating to the fuselage by altering the stiffness of the wing and fuselage, by adding surface damping treatments to the wing and fuselage, by adding blocking masses to the aircraft structure, by using passive and active vibration absorbers, by using resistively shunted and resonantly shunted piezoceramics, or by using active vibration control. Vibrations that propagate from the engine may be reduced by passive and active isolation, by active control, and by passive and active vibration absorbers.

Of particular interest to the present invention is the use of vibration control devices for actuator and/or absorber applications. Vibration control devices are conceptually simple devices consisting of a mass attached to a structure via a complex spring. When used as an actuator, the vibration control device produces vibration at a predetermined frequency in an attached structure. When used as an absorber, the vibration control device reduces vibration in an attached structure caused by a disturbance.

Vibration absorbers are typically used to minimize vibration at a specific frequency often associated with a lightly damped structural mode. For the device to operate at the correct frequency, the mass and stiffness must be chosen correctly so as to tune the device to the frequency of the offending mode or disturbance. The fact that a vibration control device may only be used at a specific frequency, however, can sometimes be the largest drawback of using these devices.

Passive vibration absorbers (PVAS) have been used in the aviation industry for quite some time. For example, the DC-9 uses a set of four PVAs attached to each engine pylon to reduce the aft cabin noise associated with the operating spool frequency of the engines. Similarly, both the Fokker F27 and the Saab 340 aircraft use PVAs attached directly to the fuselage frame to lower interior cabin noise levels. In these applications, the absorbers provide adequate vibration attenuation at specific frequencies. Performance can be seriously degraded, however, if the disturbance source changes frequency. If this occurs, the devices must be physically re-tuned. Re-tuning the vibration control devices may often be either impractical or impossible, hence there is a need for a vibration control device with properties that are easy to alter.

An object of the present invention is to provide a novel and improved vibration control device having a piezoceramic element with shunt capacitor.

Another object of the present invention is to provide a novel and improved vibration control device that is tunable to a desired frequency.

Still another object is to provide a control system for tuning a piezoceramic vibration control device to a changing disturbance frequency.

Yet another object of the present invention is to change stiffness of the piezo element by means of a shunt capacitor.

SUMMARY OF INVENTION

A vibration control device in one embodiment of the present invention has a metallic mass, a spring means including a spring and a piezoceramic element physically coupled to the mass and a capacitor coupled in shunt with the piezoceramic element. The capacitance is selected to establish the stiffness of the vibration control device.

In another embodiment of the present invention the capacitance is varied to change the stiffness and, hence, the natural frequency of the vibration control device. In one embodiment, the vibration is adapted for affixation to a structure that is subjected to a disturbance vibration having a variable frequency. The capacitance is varied to tune the natural frequency to the changing disturbance vibration frequency.

BRIEF DESCRIPTION OF DRAWINGS

In the drawings, like reference characters denote like elements of structure.

DESCRIPTION OF PREFERRED EMBODIMENTS

The inventors of the present invention have discovered that the stiffness and, hence natural frequency, of a piezoceramic vibration control device can be controlled or established by shunting the piezoceramic element with a capacitor. The capacitive electrical shunt circuit changes the effective stiffness of the piezoceramic element by providing an alternate flow path for the charge developed in the strained piezoceramic element.

In some actuator embodiments of the present invention, the capacitance is selected to establish the actuator vibration frequency. In other actuator embodiments, the capacitance is automatically varied to maintain a constant frequency vibration.

In absorber embodiments of the present invention, the capacitance is automatically varied with variances in the disturbance frequency or the primary structural response frequency of the structure. This frequency is preferably that of the harmonic or frequency at which there is the largest structural response. An aspect of the tunable piezoceramic vibration absorber is the ability to predictably change a fraction of the absorber stiffness to accurately prescribe the frequency of the device thus constantly maintaining proper tuning.

Figure 5:
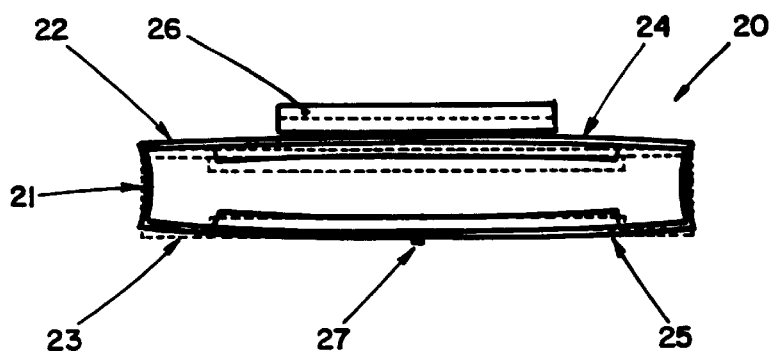
FIG. 5 is an elevation view of a piezoceramic vibration control device useful in the present invention.

With reference to FIG. 5, a piezoceramic vibration control device 20 has a spring means that includes a spring 21 and top and bottom piezoceramic elements 24 and 25. Spring 21 has the shape of a can with a top plate 22 and a bottom plate 23. Top piezoceramic element 24 is affixed as by bonding to the underside of top plate 22 and bottom piezoceramic element 25 is affixed to the topside of bottom plate 23. A metallic mass 26 is affixed to the topside of top plate 22. A mounting stud 27 extends from the bottom side of bottom plate 23 for mounting on a structure. Using both top and bottom piezoceramic elements 24 and 25 enhances the displacement amplification effect produced by a vibration.

Figure 1:
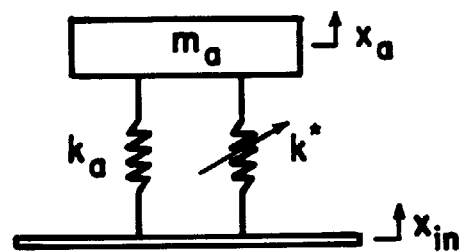
FIG. 1 is a diagram of a lumped parameter model of a piezoceramic vibration control device.

FIG. 1 shows a one degree-of-freedom lumped parameter model of the piezoceramic vibration control device 20 of FIG. 5. Note that the effective stiffness k* of the piezoceramic element within the device is variable and in parallel with the inherent device structural stiffness $k_a$ (i.e., stiffness of device housing, connectors, welds, etc.). Thus, the net device stiffness is a combination of the piezoceramic and structural stiffnesses k* and $k_a$.

The lumped parameter model shown in FIG. 1 assumes no damping is present in the device. In reality, damping does exist, but is small (less than 2%) and thus ignored for modeling purposes. The small amount of damping in the device is beneficial for the present invention as it allows significant increases in structural response reduction as compared to similar devices with more damping.

The natural frequency of the piezoceramic vibration control device is directly proportional to the square root of the ratio of device stiffness to absorber mass, $m_a$. Changing the effective piezoceramic stiffness changes a fraction of the device stiffness, in turn making the natural frequency of the piezoceramic vibration absorber variable.

Changing the effective stiffness of the piezoceramic within the vibration control device is realized by electrically shunting the piezoceramic element. Passively shunting a piezoceramic changes the complex stiffness of the material. Capacitive shunting changes the stiffness of the device only.

An expression was developed to relate the electrical impedance of the electrical shunt circuit to the effective stiffness of the piezoceramic element, namely:

$$k^* = k^E \left(1 + \frac{k_{ij}^2}{1 - k_{ij}^2 + \alpha(s)}\right)$$

with parameters defined as follows:

k* the effective shunted piezoceramic stiffness $k^E$ the piezoceramic stiffness measured at constant electrical field (i.e., short circuit)

$k_{ij}$ the effective piezoceramic material coupling coefficient

α(s) the ratio of the piezoceramic electrical impedance measured under constant stress conditions, $Z_{oc}^T$, to the shunt electrical impedance, $Z_{sh}$.

For the purposes of the invention described herein, α(s) is the following ratio of capacitances:

$$\alpha(s) = \frac{C_{sh}}{C_P^T}$$

where $C_{sh}$ is the capacitance of the shunt capacitor and $C_P^T$ is the capacitance of the piezoceramic measured under constant stress conditions.

Figure 2:
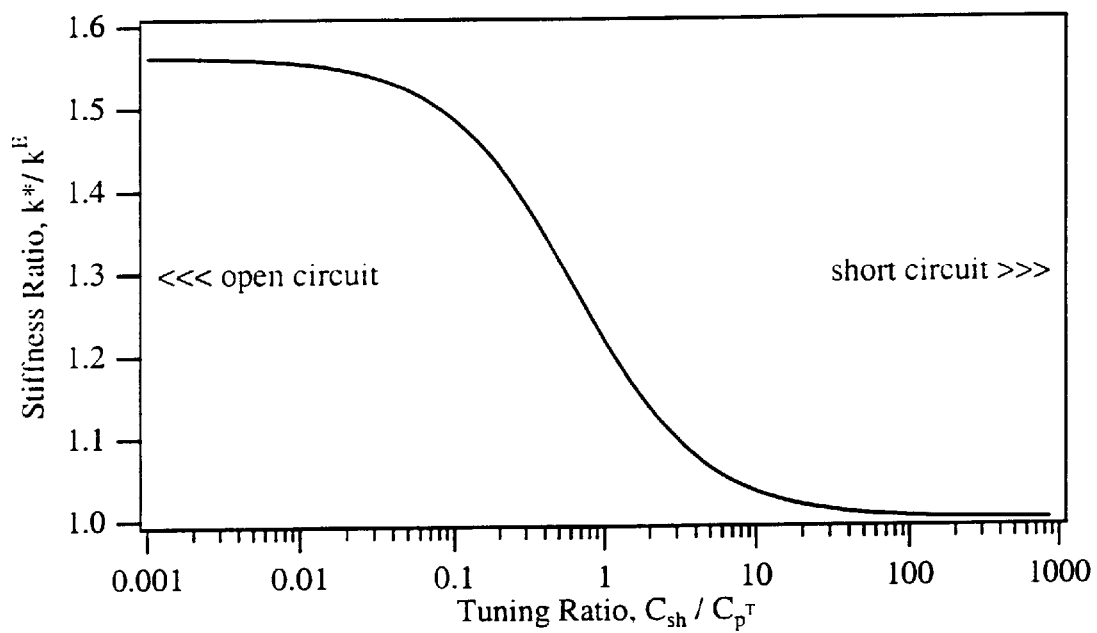
FIG. 2 is a graph of the stiffness ratio versus tuning ratio for the FIG. 1 model.

FIG. 2 shows the theoretical relationship between the effective shunted piezoceramic stiffness normalized to the short circuit piezoceramic stiffness as a function of tuning ratio, α(s). Note that the curve in FIG. 2 corresponds to a piezoceramic with a material coupling coefficient of 0.6.

For very small shunt capacitances (i.e., an approximately open circuit electrical shunt condition), the piezoceramic element is approximately 60% stiffer than it is when it is shunted with very large shunt capacitance (i.e., an approximately short circuit electrical shunt condition). The important trend to notice in FIG. 2 is the smooth variation in stiffness of the piezoceramic between tuning ratios of 0.01 and 100.

If a device were made solely of a piezoceramic material similar to the one modeled in FIG. 2, the 56% change in stiffness from open to short circuit would translate to an almost 25% change in device natural frequency. As mentioned earlier, the net device stiffness is the combination of the piezoceramic stiffness and the absorber structure stiffness. Therefore, only a fraction of the device stiffness may be changed by shunting the piezoceramic element.

An experiment was conducted to quantify the effect of capacitive shunting on the natural frequency of a candidate piezoceramic vibration absorber. The candidate piezoceramic vibration absorber was the Piezoceramic Inertial Actuator (PIA), Model Number 712A02 available from PCB Piezotronic. Passively, the PIA behaves as a vibration absorber exhibiting a device resonance frequency related to the stiffness and mass of the device (the resonance frequency of the device defines the frequency of minimum coupled system structural response).

Figure 3:
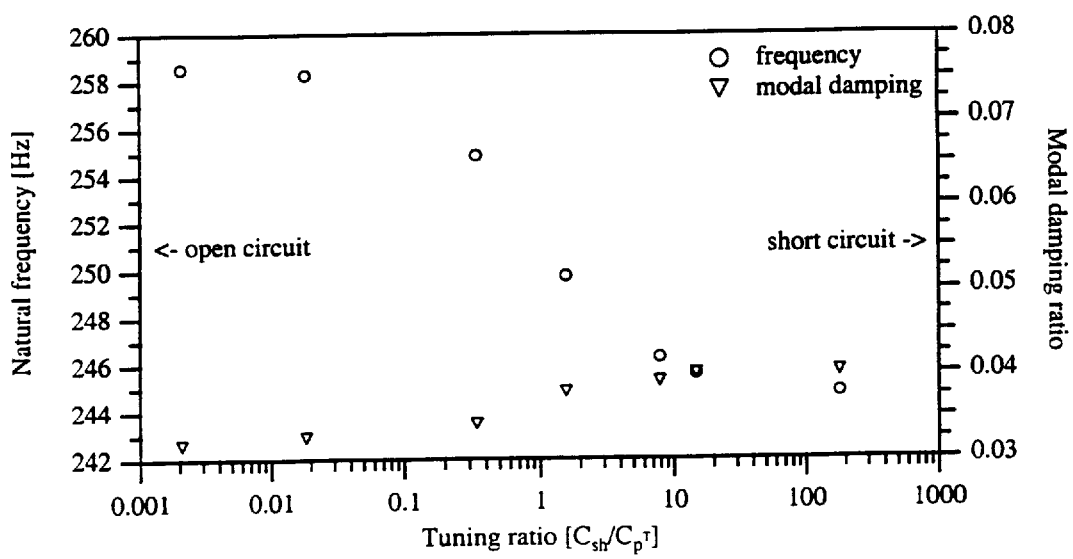
FIG. 3 is a graph of natural frequency and of modal damping ratio versus tuning ratio for the FIG. 1 model.

FIG. 3 illustrates the effect of capacitive shunting on the experimentally measured natural frequency and modal damping ratio of the candidate piezoceramic inertial actuator. At very low values of capacitive shunt ratio (i.e., close to open circuit electrical conditions) the PIA fundamental natural frequency is approximately 258 Hz. As the shunt ratio increases, the fundamental natural frequency decreases, and as $C_{sh}/C_p^T$ approaches infinity, the PIA natural frequency asymptotically approaches a value of approximately 244 Hz (over a 5% change in natural frequency from short circuit to open circuit condition).

FIG. 3 also illustrates the effect of varying the shunt capacitance on the fundamental modal damping ratio. From the data, it appears that as the piezoceramic becomes less stiff, there is a corresponding increase in modal damping ratio. Thus, the fundamental modal damping ratio ranges from roughly 3.2% for the open circuit case ($C_{sh}/C_p^T$ very small) to approximately 4.0% for the short circuit case ($C_{sh}/C_p^T$ very large). One explanation for the increase in the fundamental mode's modal damping ratio from open circuit to short circuit is that as the piezoceramic element becomes less stiff with increasing shunt capacitance, a larger fraction of strain energy is imparted to the lossy material included in the actuator to limit response at resonance, thus raising the modal damping ratio.

The experimental open and short circuit natural frequencies were also used to calculate parameters for the lumped parameter piezoceramic vibration absorber model shown in FIG. 1. Results based upon the data and a reported piezoceramic material coupling coefficient of 0.6 indicate that 21% of the short circuit device stiffness is due to the piezoceramic. With appropriate absorber design, the piezoceramic stiffness fraction could be significantly increased, thus increasing the tuning range of the device.

Figure 4:
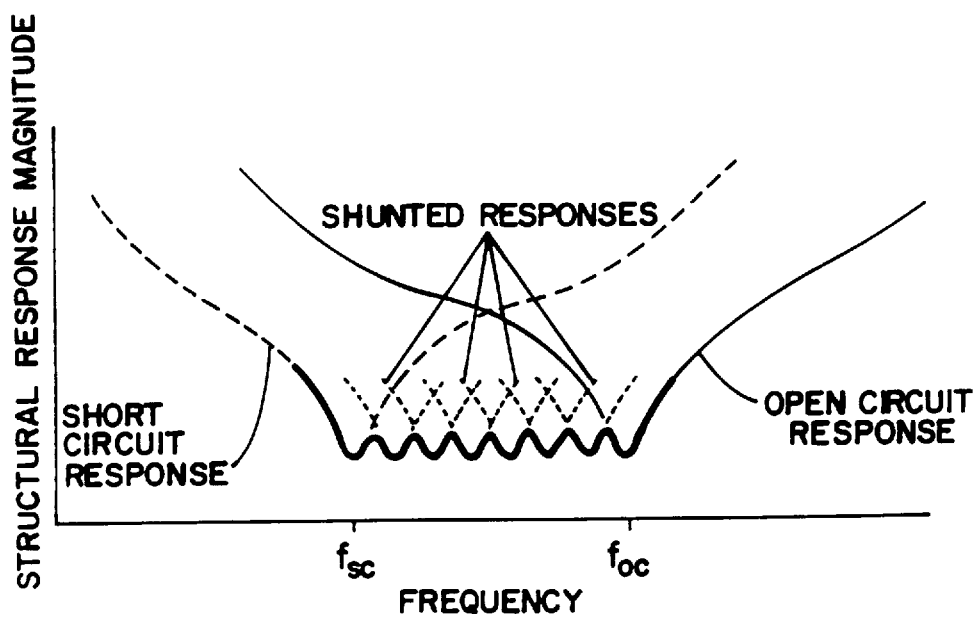
FIG. 4 is a graph of structural response magnitude versus frequency for the FIG. 1 model.

Monitoring the disturbance frequency and tuning the absorber to maintain minimum structural response is illustrated in FIG. 4 with a graphic showing the transfer function zeros (or minimums) created by the addition of a short, shunted, and open circuit piezoceramic vibration control device to the structure.

First, consider the case when the piezoceramic element within the PIA is short circuited (indicated by the dashed line in FIG. 4). If a tonal disturbance frequency were applied to the structure at a frequency equal to $f_{sc}$, structural response would be minimal. If the disturbance frequency were to decrease while the piezoceramic element remained short circuited, structural response would increase. Similarly, if the disturbance frequency were to increase to the frequency $f_{oc}$, while the piezo element remained short circuited, structural response would again increase. However, if the absorber were re-tuned by adjusting the electrical shunt impedance to an open circuit condition structural response would remain minimal. In addition, if the disturbance frequency were to fall anywhere between $f_{sc}$ and $f_{oc}$, there exists a shunt impedance that will provide minimum structural response.

Consider the following scenario: a structural mode is excited by a pure tone harmonic disturbance which varies in frequency by a few percent of some nominal frequency. In principle, a PIA-based vibration absorber could be added to the structure such that at a shunt tuning ratio of one, the natural frequency of the absorber would be equal to the nominal disturbance frequency (i.e., the natural frequency of the absorber for a tuning ratio of one is half-way between $f_{sc}$ and $f_{oc}$). If sensing (in the form of determining the frequency of the disturbance), control (in the form of a command signal based on the sensed frequency to alter the electric shunt impedance), and actuation (in the form of a means to alter the electrical shunt condition) are provided, then minimum structural response can be maintained within the band defined between the open and short circuit frequencies of the PIA.

The heavy solid line in FIG. 4 illustrates the conceptual response of a discretely tuned PVA. In this illustration, the shunt capacitance does not vary smoothly between $f_{sc}$ and $f_{oc}$, but instead is discretized.

Figure 6:
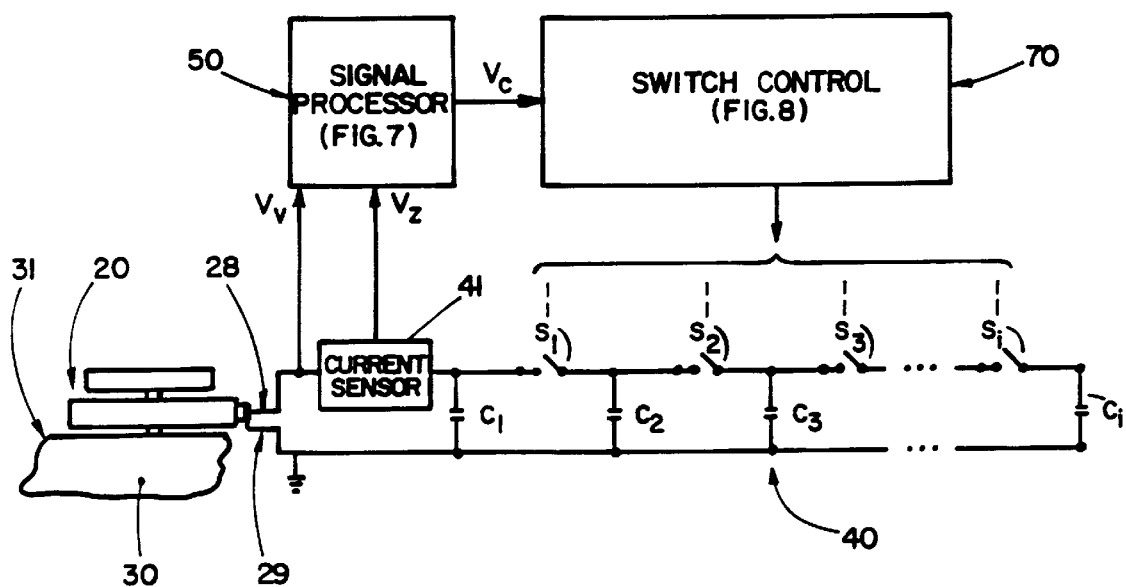
FIG. 6 is a block diagram in part and a circuit diagram in part illustrating a piezoceramic vibration control device and a control system therefore, each embodying the present invention.

With reference now to FIG. 6, a piezoceramic vibration control device and tuning control system will be described for an absorber embodiment of the present invention. In FIG. 6, the vibration control device 20 is affixed by mounting stud 27 to a structure 30 to which a disturbance vibration is imparted by instrumentalities contained within the environment of structure 30 as illustrated by arrow 31. A capacitor circuit 40 is connected in shunt with piezoceramic vibration control device 20 by means of output terminals 28 and 29 of piezoceramic vibration control device 20.

The capacitor circuit 40 is a ladder arrangement having capacitors C1, C2, C3, . . . and Ci and switches S1, S2, S3, . . . and Si wired for connecting the capacitors in parallel. The effect of placing the capacitors in parallel is a net capacitance equal to the sum of the capacitances of the capacitors that are connected in parallel.

A signal processor 50 monitors the voltage output Vv from piezoceramic vibration control device 20 and a voltage Vi that is proportional to the current output of piezoceramic vibration control device 20. The voltage Vi is generated by current sensor 41 that responds to the current output to produce the voltage Vi. Signal processor 50 processes the signals Vv and Vi to produce a control signal Vc which is indicative of the frequency of the disturbance vibration in the structure 30.

A switch control 70 responds to the control signal Vc to operate the switches S1, S2, S3, . . . and Si to configure. capacitors C1, C2, C3, . . . and Ci into the ladder network. The switch control 70 and switches S1, S2, S3 . . . and Si together form a selector circuit for configuring a selected number of capacitors C1, C2, C3, . . . and Ci into the ladder network, where the selected number yields a shuntcapacitance that is needed to tune the frequency of the vibration control device 20 to the frequency of the disturbance vibration in structure 20.

Figure 8:
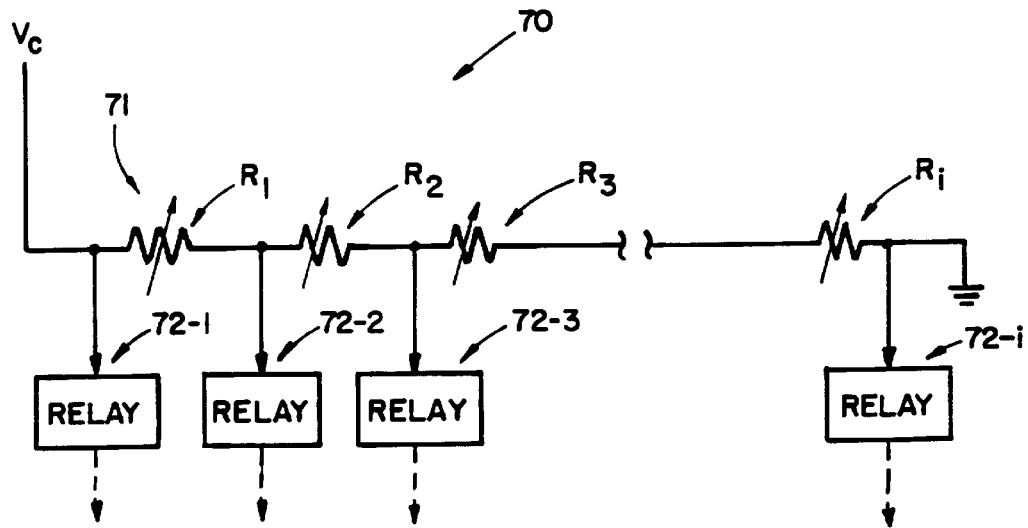
FIG. 8 is a block diagram in part and a circuit diagram in part of the switch control contained in FIG. 6.

Referring now to FIG. 8, switch control 70 includes a resistor divider 71 across which control voltage Vc is applied. Resistor divider 71 has series connected variable resistors R1, R2, R3 . . . and Ri. Relay circuits 72-1, 72-2, 72-3 . . . and 72-i are connected b etween variable resistors R1, R2, R3 . . . and Ri for control of switches S1, S2, S3, . . . and Si in FIG. 6. Simply stated divider 71 divides the input voltage Vc such that as Vc increases, relay circuits 72-1, 72-2, 72-3 . . . and 72-i are operated in sequence to close switches S1, S2, S3, . . . and Si.

Variable resistors R1 through Ri are adjusted such that for $V_c$=1V, relay circuit 72-1 turns on while the other relay circuits remain off. For $V_c$=2V, relay circuits 72-1 and 72-2 turn on while the other relay circuits remain off and so on.

Figure 7:
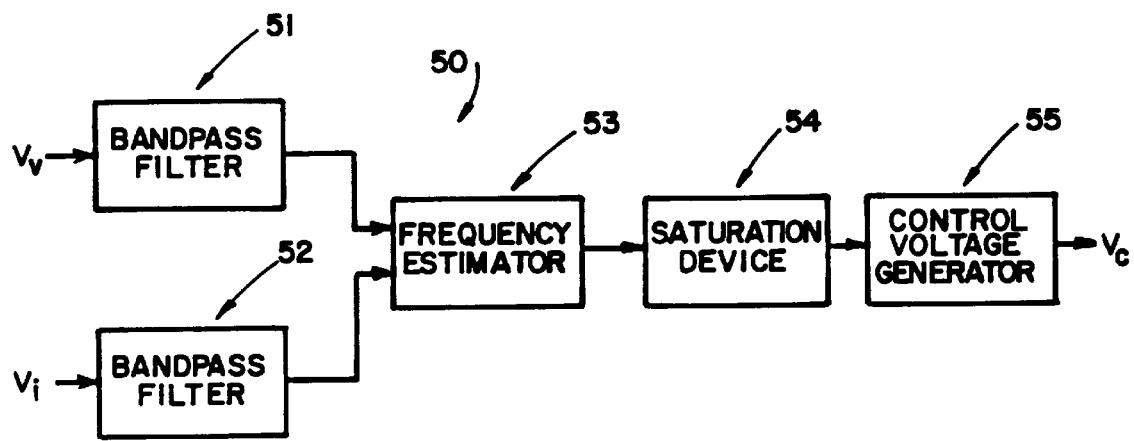
FIG. 7 is a block diagram of the signal processor contained in FIG. 6.

Referring now to FIG. 7, signal processor 50 is shown to include a voltage bandpass filter 51 and a current bandpass filter 52. Each of the filters 51 and 52 is operable to pass frequencies only within the frequency band for which the piezoceramic element has a meaningful response. In one embodiment this frequency band is 130 to 780 Hz which encompasses the range of frequencies 290 to 350 Hz defined by the short and open circuit resonance frequencies of the PIA.

The filtered signals from the outputs of filters 51 and 52 are applied to a frequency estimator 53 which is operable to estimate the tonal frequency of the disturbance vibration. This estimate may be performed by a control computer or alternatively by an analog circuit in the form, for example, of a phase locked loop to convert the filtered signals to a signal proportional to the tonal frequency.

This signal is then passed through a saturation device 54 which serves to clamp any voltage above a maximum value or below a minimum value to the maximum or minimum values, respectively. The output of saturation device 54 is then processed by a control voltage generator 55 to produce the control voltage Vc.

Figure 11:
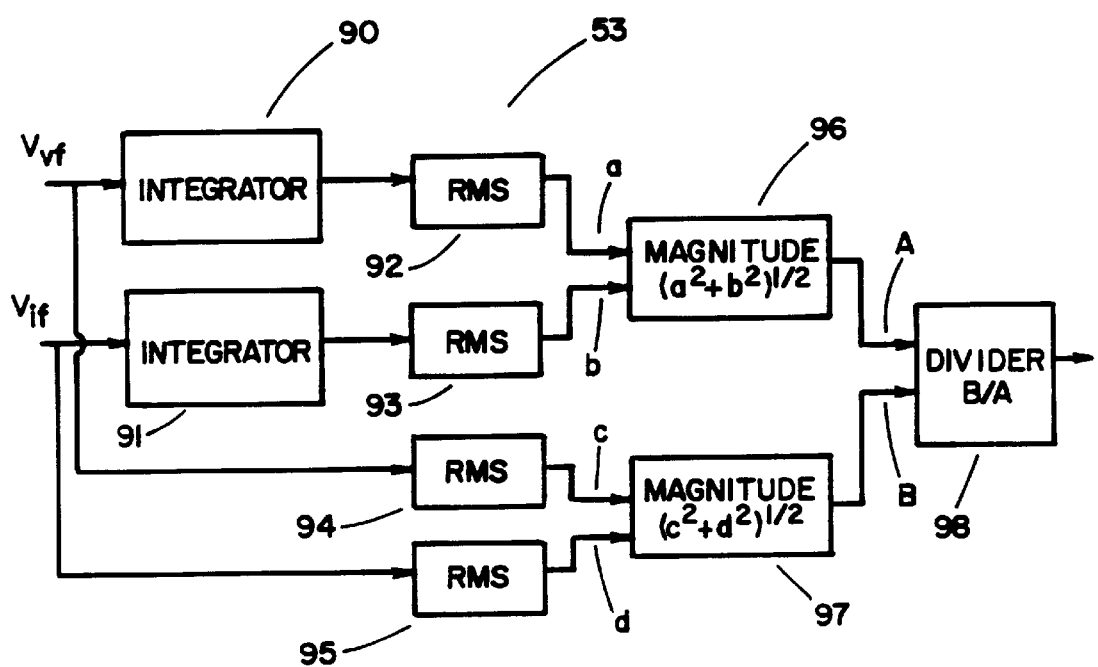
FIG. 11 is a block diagram of an exemplary frequency estimator for the signal processor of FIG. 7.

An exemplary frequency estimator 53 is illustrated in FIG. 11. Frequency estimator 53 has integrators 90 and 91 which receive as inputs the filtered signals voltage and current signals Vvf and Vif, respectively. After integration by integrators 90 and 91, the these signals are converted to root mean square (RMS) form by RMS circuits 92 and 93 to provide signals a and b, respectively. The effect of integration followed by RMS conversion is like dividing by frequency. Signals Vvf and Vif are also converted to RMS form by RMS circuits 94 and 95 to provide signals c and d, respectively. Signals a and b and signals c and d are combined in magnitude circuits 96 and 97 to provide signals A and B, respectively. Signal b is divided by signal A in divider 98 to provide an output voltage, the amplitude of which is proportional to the disturbance frequency.

The design strategy for frequency estimator 53, saturation device 54 and control voltage generator 55 is a function of the frequency tuning band of the PIA. The frequency tuning band of the shunted PIA is discretized into a finite number of capacitive impedances. This allows the selection of a the proper number of parallel capacitors whose sum would be the proper electrical impedance to tune the PIA very close to the estimated disturbance frequency.

For an exemplary embodiment, a discretized shunt circuit with 10 discrete capacitance levels ranging from approximately 0.7 nF to 7 $\mu$F is selected. Ideally, each discrete shunt capacitance tunes the PIA such that structural response is a minimum for a prescribed frequency within the control band width. Thus, the tunable frequency band is divided into nine equally spaced frequency bands between the short and open circuit natural frequencies of the PIA as shown in FIG. 9.

The frequencies $f_{sc}$, $f_1$ through $f_8$, and $f_{oc}$ on the border of each frequency band define frequencies at which the cumulative combinations of shunt capacitance prescribe the shunted natural frequency of the PIA. The open circuit shunt case corresponds to a very small (or zero) shunt capacitance. Thus, if capacitor C1 in FIG. 6 were very small (or removed) and all switches were open, the PIA would be in an approximately open circuit shunt condition (i.e., the natural frequency of the PIA would equal $f_{oc}$). Next, consider closing the switch S1 in FIG. 6. The net capacitance of the shunt circuit increases to the sum of C1 and C2. Conversely, the natural frequency of the PIA decreases to $f_8$ (see FIG. 9), assuming C1 and C2 are chosen correctly. Similarly, closing switches S1 and S2 will increase the net shunt capacitance to the sum of the C1, C2, and C3 and the PIA natural frequency (and thus the frequency of minimum structural response) will decrease to $f_7$ (FIG. 9). Closing all of the switches will increase the net shunt capacitance to the total of all of the capacitors in the ladder circuit. Thus, if C1 through Ci are chosen correctly, the sum of all the capacitors will be large enough to approximate a short circuit shunt condition (i.e., the total parallel capacitance will be greater than or equal to $100 \times C_p^T$).

Figure 9:
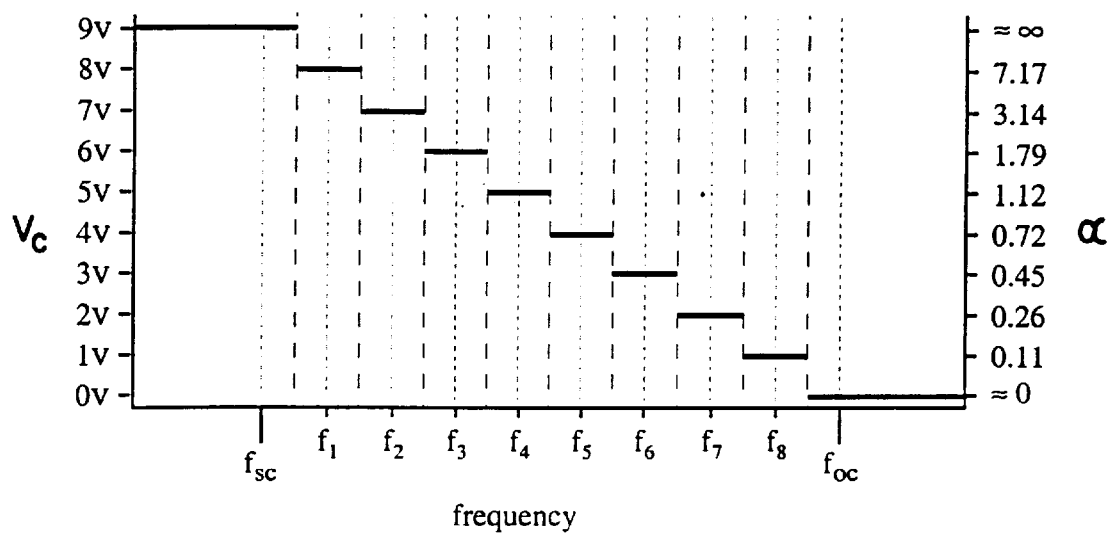
FIG. 9 is a graph of control voltage Vc and of tuning ratio a versus frequency for the FIG. 6 embodiment.

FIG. 9 is a graphical representation of the correlation between control voltage $V_c$, PIA capacitive tuning ratio, $\alpha$, and the frequency of minimum structural response. From FIG. 9, it is clear that for a control voltage of 0V, no relay circuits are on and, thus, the PIA is shunted with one capacitor C1. If C1 is sufficiently small (say approximately $0.01 \times C_p^T$), the PIA will behave as if it is open circuited. For a control voltage of 1V, the first relay circuit 72-1 (FIG. 8) turns on and the shunt capacitance is increased from C1 to the sum of C1 and C2. If C2 equals $0.1 \times C_p^T$, the net tuning ratio would be approximately 0.11 and the natural frequency of the PIA and therefore the frequency of minimum structural response would be $f_8$.

Table 1 summarizes the tuning ratios, capacitances, and control voltages needed to discretely tune the PIA from open to short circuit frequency. Note that each tuning frequency has an associated tuning ratio. In turn, each tuning ratio has a corresponding net shunt capacitance. Thus each ladder leg capacitance (i.e., the capacitors labeled C1 through Ci in FIG. 6) must be correctly chosen to assure proper net shunt capacitance levels. Finally, each ladder leg capacitance has a corresponding control voltage level, Vc, at which its associated relay circuit 72 is turned on.

TABLE 1

Discretized tuning circuit parameters

| Tuning Frequency | Tuning ratio $\alpha$ | Net shunt Capacitance, $C_{tot}$ [$\mu$F] | Ladder leg capacitance, $C_i$ [$\mu$F] | Control Voltage, $V_c$ [V] |
|---|---|---|---|---|
| $f_{oc}$ | 0.01 (Å0) | 0.00072 | $C_0$ = 0.00072 | 0 |
| $f_8$ | 0.11 | 0.00805 | $C_1$ = 0.00733 | 1 |
| $f_7$ | 0.26 | 0.01841 | $C_2$ = 0.01036 | 2 |
| $f_6$ | 0.45 | 0.03223 | $C_3$ = 0.01382 | 3 |
| $f_5$ | 0.72 | 0.05157 | $C_4$ = 0.01934 | 4 |
| $f_4$ | 1.12 | 0.08059 | $C_5$ = 0.02902 | 5 |
| $f_3$ | 1.79 | 0.12897 | $C_6$ = 0.04838 | 6 |
| $f_2$ | 3.14 | 0.22574 | $C_7$ = 0.09676 | 7 |
| $f_1$ | 7.17 | 0.51605 | $C_8$ = 0.29032 | 8 |
| $f_{sc}$ | 0.01 (Å) | 7.20000 | $C_9$ = 6.68395 | 9 |

As shown in FIG. 9 and listed in Table 1, varying the control voltage $V_c$ from 0 to 9V changes the frequency of minimum structural response from the PIA's approximate open to approximate short circuit natural frequency. Referring to the control system block diagram in FIG. 7, the estimate control voltage block 55 contains the code to convert the estimated disturbance frequency signal to the control voltage Vc.

Figure 10:
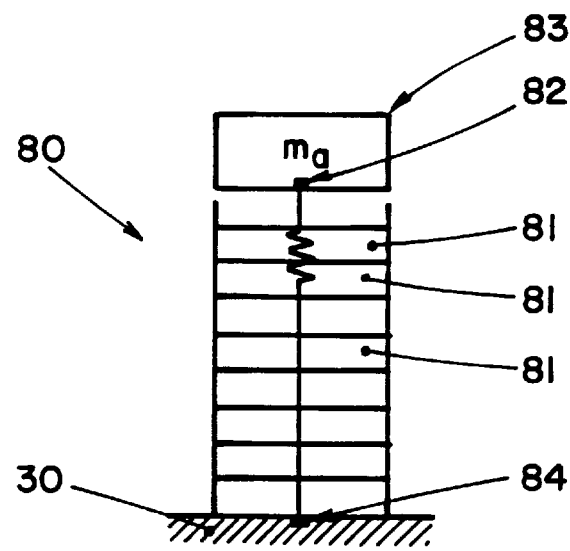
FIG. 10 is an elevational view of another piezoceramic vibration control device embodying the present invention.

Referring now to FIG. 10, there is shown a piezoceramic vibration control device 80 constituting another embodiment of the present invention. Piezoceramic vibration control device 80 includes a plurality of piezoceramic elements 81 arranged in a stack and bonded to one another. A stud 82 is situated to attach the top of the stack to a metallic mass 83. Another stud 84 is situated to attach the bottom of the stack to structure 30. A soft spring 85 is arranged in contact with the stack to provide a precompression force to the stack of piezoceramic elements 81. For illustrated design, the spring is shown extending through the center of the stack of piezoceramic elements 81.

Piezoceramic elements 81 are comprised of 3-3 material which has a relatively high material coupling coefficient of about 0.7 which, in combination with low parallel (parasitic) stiffness (Ko), gives a larger tuning range. This arrangement yields an open circuit to short circuit stiffness ratio of approximately 2.0 and an open circuit to short circuit frequency ratio of approximately 1.4. The tuning range is about 40% of the short circuit frequency, about 30% of the open circuit frequency and about ±18% of the center frequency. This compares to about ±3.5% of the center frequency for the piezoceramic vibration control device 20 in FIG. 5 which has a material coupling coefficient of 0.6.

Modifications can be made to the illustrated embodiment without departing from the spirit of the invention. Accordingly, the preferred embodiments are illustrative only and are not intended to limit the scope of the invention.

What is claimed is:

1. A vibration control device, comprising:

a mass;

spring means including a spring and a piezoceramic element coupled physically to said mass;

a variable capacitance coupled in shunt with said piezoceramic element for altering stiffness of said piezoceramic element; and a signal processor being responsive to an electrical signal induced in said piezoceramic element by a disturbance vibration to produce a control voltage indicative of the frequency of said disturbance vibration; and a selector circuit including a voltage divider for dividing said control voltage into at least one of a plurality of switching signals for operating at least one of a like plurality of switches for automatically configuring said variable capacitance to tune the frequency of said vibration control device to said frequency of said disturbance vibration by changing said stiffness of said piezoceramic element.

2. The invention according to claim 1, wherein said variable capacitance comprises a like plurality of discrete capacitors; and wherein said plurality of discrete capacitors are arranged in parallel to form a ladder network with said like plurality of switches.

3. A vibration control device adapted for attachment to a structure that is subjected to a disturbance vibration having a variable frequency, said structure having a primary structural response frequency for a given frequency of said disturbance vibration, comprising:

a mass;

a plurality of piezoceramic elements arranged in a stack bonded to one another and said stack being physically coupled to said mass; and a spring situated to apply a precompression force to said piezoceramic elements;

a variable capacitance coupled in shunt with said stack of said piezoceramic elements;

a signal processor for sensing said primary structural response frequency and producing a control voltage indicative of the frequency of said disturbance vibration for automatically adjusting a capacitance value of said variable capacitance; and a selector circuit including a voltage divider for dividing said control voltage into at least one of a plurality of switching signals for operating at least one of a like plurality of switches for automatically configuring said variable capacitance to tune a natural frequency of said vibration control device to said primary structural response frequency by changing stiffness of said piezoceramic element.

4. The invention according to claim 3, wherein said variable capacitance comprises a like plurality of discrete capacitors; and wherein said plurality of discrete capacitors are arranged in parallel to form a ladder network with said like plurality of switches.

* * * * *

UNITED STATES PATENT AND TRADEMARK OFFICE
CERTIFICATE OF CORRECTION

PATENT NO. : 6,193,032 B1
DATED : February 27, 2001
INVENTOR(S) : Lesieutre et al.

It is certified that error appears in the above-identified patent and that said Letters Patent is hereby corrected as shown below:

Column 1,
Line 6, after the word "absorbers." insert the following:
-- This invention was made with support from the Government under Contract rights No. NO0014-96-1-1173, awarded by the U.S. Department of the Navy. The Government has certain rights in this invention. --

Signed and Sealed this

Twenty-sixth Day of April, 2005

JON W. DUDAS
*Director of the United States Patent and Trademark Office*